Feb. 19, 1935. H. HOLZWARTH 1,991,390
EXPLOSION CHAMBER AND METHOD OF CHARGING SAME
Filed July 23, 1931    2 Sheets-Sheet 1

Inventor
HANS HOLZWARTH
By Joseph Hirschman
Attorney

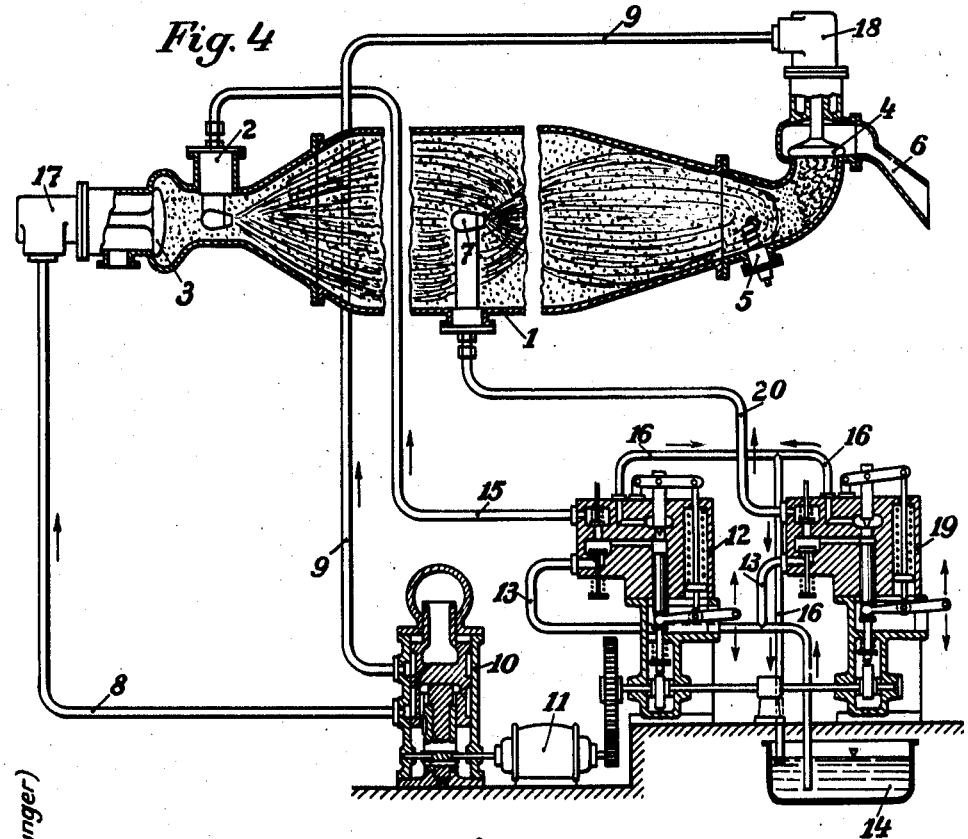
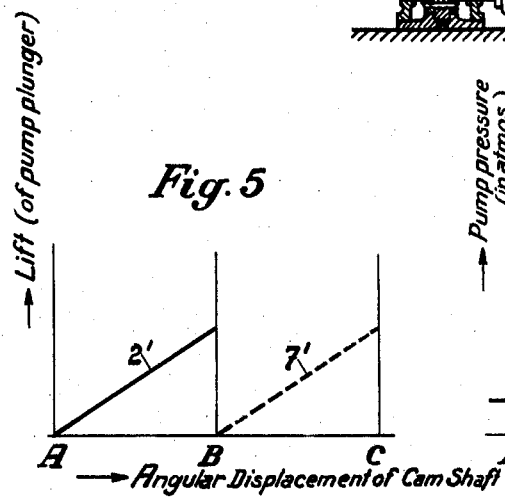
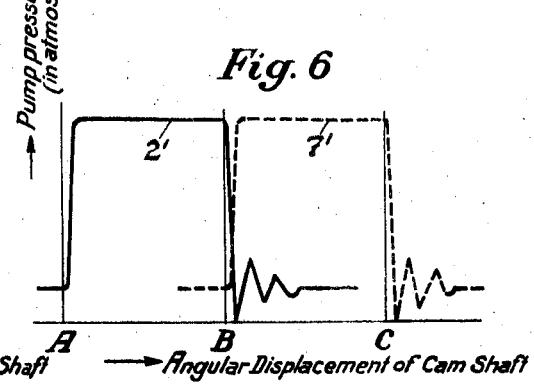

Patented Feb. 19, 1935

1,991,390

UNITED STATES PATENT OFFICE 1,991,390

EXPLOSION CHAMBER AND METHOD OF CHARGING SAME

Hans Holzwarth, Dusseldorf, Germany, assignor to The Holzwarth Gas Turbine Company, San Francisco, Calif., a corporation of Delaware Application July 23, 1931, Serial No. 552,651
In Germany July 30, 1930

15 Claims. (Cl. 60—41)

The present invention relates to explosion chambers of the constant volume type, and more particularly to a method of and apparatus for charging a chamber of this type with fuel in a novel and improved manner whereby important advantages are secured.

My invention is based upon the recognition, confirmed by extensive research, that explosion chambers and constant pressure chambers (or burners) are differentiated not only in the conditions under which the combustion takes place, for example in the fact that in the one case the combustion takes place under constant volume while in the other it occurs under constant pressure, but also in the manner in which the combustion proceeds. While in constant pressure chambers, particularly those which have been proposed for use with constant pressure turbines, and also in burners, for example oil and coal dust burners for heating steam boilers, fuel is introduced into an already formed flame, produced by the combustion of the initially introduced portion of the fuel charge, and then becomes ignited and burned, such a mode of operation, I have found, leads to the most serious disadvantages in the case of explosion chambers. There occurs in the latter a slow combustion which is not yet ended at the beginning of the nozzle valve opening, so that unburned components of the gas mixture flow out of the chamber. In explosion chambers, therefore, the fuel required for a working cycle must be introduced before the ignition takes place. This ignition can occur as a result of various circumstances. An igniting spark can, for example, penetrate through the ignitable mixture located in the vicinity of the controlled igniter; conversely, an ignitable mixture can be conveyed to a continuous igniter, for example, a long-continuing spark, an incandescent igniter, a catilytically acting material, the hot combustion gas residue, the hot dividing zone between the combustion gas residue and the scavenging air, or hot parts of the chamber, all of which cannot be controlled or timed by external mechanism. In each case the initial ignition will occur at one of these places. If the initial ignition occurs before the termination of the filling of the chamber with combustible mixture, then the remainder of the mixture or the remainder of the fuel serving to form the mixture is introduced into the already formed flame and there occurs the serious disadvantage of knocking. In addition, the increase in pressure (explosion) attending the development of the flame strikes back through the air charging valve into the air conduit if the air is introduced simultaneously with the fuel, which is desirable in the interest of proper atomization of the fuel, through mixture thereof with air, and uniform distribution of the mixture in the chamber.

To secure satisfactory operation of the explosion chamber these disturbing occurrences must be eliminated. The measures for eliminating the same depend upon whether the initial ignition is effected by an externally controlled igniter or by one of the above described continuously operating ignition means, that is, it depends upon whether the spark is brought to the mixture or the mixture to the ignition place. In the first case necessary regulation is obtained simply by delaying the instant at which the controlled spark plug is fired. The present invention has nothing to do with this simple and obvious procedure. The present invention resides rather in the provision of suitable measures for controlling the mixture which is brought to the ignition place (continuous operating igniter) which produces the initial ignition.

I have found that explosion chambers of the constant volume type are most advantageously built in the form of elongated cylinders with conical ends; at one end the inlet members (the air and fuel valves) are arranged and at the other end the outlet members (the nozzle valve, and also, if desired, an auxiliary outlet valve). An explosion chamber of this form has the peculiarity that the outlet end becomes considerably hotter than the inlet end, as all of the combustion gases flow through such outlet end, while the inlet end is heated mainly by radiation. This preferably conical end will be hotter the greater the velocity with which the combustion gases flow to the nozzle valve, and therefore the more strongly the cone tapers to the nozzle valve. The temperature of the wall of the outlet end of the chamber is also influenced by the temperature of the cooling agent. If a hot cooling agent is employed which facilitates greatly the complete combustion of difficultly ignitable fuels and has other thermal advantages, the inner surfaces of the wall of the outlet end easily attain temperatures which lie above the ignition temperature of the fuel, which in the case of gas oil is about 245° C. These walls of the outlet end of the chamber can therefore easily become igniting places and operate as non-controlled continuous igniters in the above sense. The same applies to combustion gas residues which remain in the vicinity of the nozzle valve, or to the dividing zone between the scavenging air and combustion gas residue, which through mixture with the residual gases or through radiation of heat from such gases and from the chamber wall can easily be brought to the ignition temperature. If incandescent igniters are arranged at these places they would operate in the same manner. In the subsequent description of the invention all of these places at the outlet end of the chamber will be referred to as igniting places.

If an externally controlled igniter is located at the igniting place and if the moment of firing coincides with the moment of ignition by the controlled continuous igniting place then its action is no different from that of the uncontrolled igniting place. For this case also the improved mode of control of the mixture according to the present invention applies. For starting purposes and for insuring ignition during fluctuations in the load it is preferable to arrange also controlled spark plugs which are distributed along the length of the chamber and are preferably fired shortly after the moment of ignition of the mixture by the continuous ignition place. The arrangement of these additional controlled igniters relates however to procedures which, as will be clear from the above explanation, have nothing to do with the essence of the present invention.

The present invention resides in the fact that at the beginning of the fuel admission, if desired when the fuel inlet valve is already completely opened, the cool portion of the chamber situated at the air inlet end is filled with fuel which remains in and occupies such inlet end, and the filling with fresh, additional fuel proceeds uniformly to the end of the fuel admission toward the igniting place at the outlet end, each successive portion of fuel reaching a state of more or less complete quiescence in a portion of the chamber more remote than the portions of the chamber occupied by the previously introduced portions of the same charge. The space immediately in the vicinity of the fuel inlet member therefore first receives its quota of fuel which at least in large part continues to remain therein until the ignition, then the further removed parts receive their quota of fuel and finally those parts which are at the greatest distance from the inlet valve, that is, the parts at the outlet member of the explosion chamber. The whole chamber is therefore already filled with a combustible mixture when the last portion of fuel approaches the igniting place at the outlet end. As a result, no more fuel is introduced at any place in the combustion chamber into the flame arising through the initial ignition at the igniting place, so that the disadvantages associated with the feeding of fuel into an already formed flame can no longer arise.

My improved method of progressive filling of the chamber with fuel from the inlet end toward the ignition place (as contrasted with prior methods of charging wherein the chamber is filled first in the portions removed from the inlet end, the portion in the vicinity of the inlet member being filled last with fuel) can be accomplished in a variety of ways. A stepwise progressive filling of the chamber can be effected by admitting the fuel at a plurality of points distributed along the length of the chamber, the introduction of fuel in the neighborhood of the ignition place, which is located in the vicinity of the exhaust valve, being made to occur later than in the parts of the chamber more removed from such point.

A more uniformly progressive filling of the chamber can be accomplished, in a further development of the invention, by repeated increase of the pressure at which the fuel is introduced into the chamber during the time interval allotted for the fuel admission. These two modes of procedure can be combined, such combined process being of particular value, for example, in the case of chambers of very high capacities.

The mechanism for carrying out my improved process can be constructed in various ways. The stepwise progressive filling of the chamber may be accomplished by means of fuel inlet members distributed along the length of the explosion chamber and operated one after another, the inlet member located nearest to the exhaust valve being operated after those which are further removed from such point. The phase displacement can also be accomplished in a variety of ways. A particularly simple mechanism for accomplishing such displacement is obtained if the driving members, such as cams or eccentrics, of the fuel pumps associated with the fuel inlet members are displaced with respect to each other in correspondence with the time sequence in the actuation of the individual fuel inlet members.

The constantly progressive filling of the chamber is preferably accomplished by increase of the pressure at which the fuel is admitted into the chamber during each cycle. To accomplish such result in a simple manner there may be employed a cam of such form for effecting the pressure lift of the fuel pump plunger that the lift of the plunger accomplished during each unit of time increases up to a maximum value. It is within the scope of the invention to accomplish the same result by other means. Also the mechanism for effecting the feed of the fuel in timed sequence can be combined with mechanism for increasing the pressure at which the fuel is introduced, particularly in the case of rather large explosion chambers.

The invention will be further described in connection with the accompanying drawings which illustrate by way of example two embodiments of the invention.

In said drawings

Fig. 4 illustrates a modification wherein two fuel inlet elements are provided; and Figs. 5 and 6 show the corresponding cam surface and pump pressure diagrams of the two fuel pumps associated with the fuel inlet members.

Figure 1:
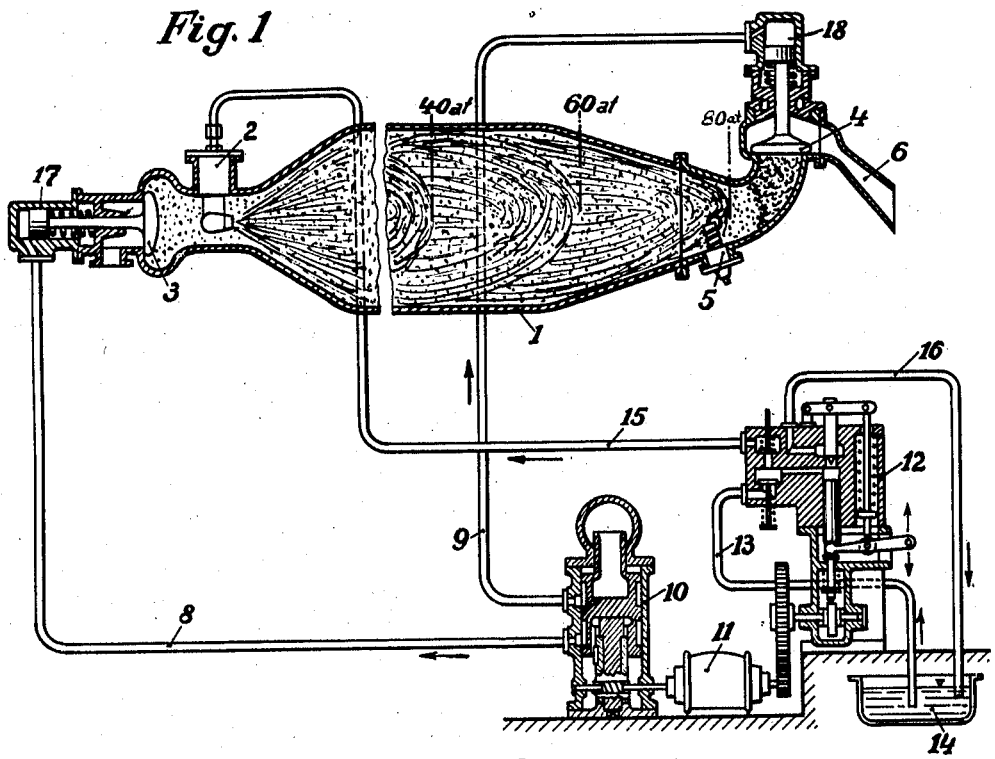
Fig. 1 shows a longitudinal section through an explosion chamber and its associated fuel pump and valve control mechanism.

The explosion chamber is indicated in Fig. 1 by the numeral 1, while 2 indicates the fuel inlet member or valve, 3 the air inlet valve, 4 the exhaust valve and 5 the igniting element. Upon opening of the exhaust member 4, the combustion gases are discharged through a nozzle 6 for use outside of the chamber, as for example, against the blades of a turbine rotor.

Figure 2:
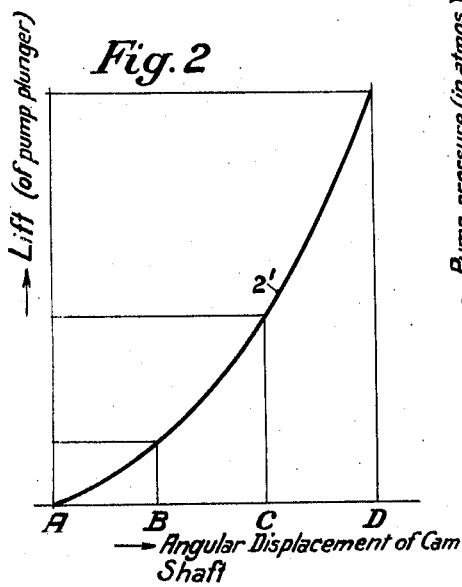
Fig. 2 shows a development of the cam surface of the fuel pump associated with the fuel inlet member shown in Fig. 1.
Figure 3:
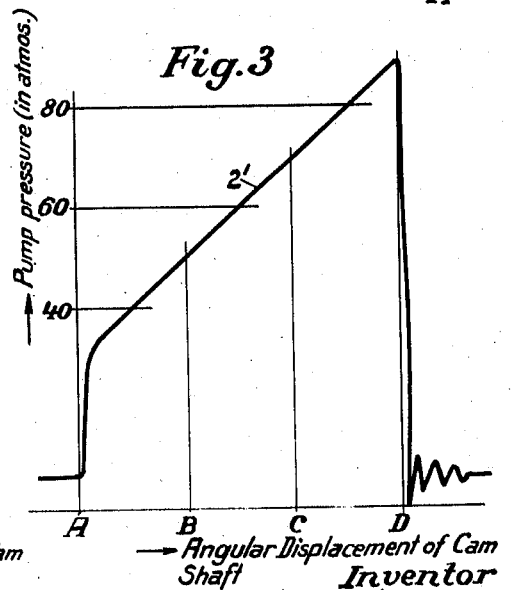
Fig. 3 illustrates the corresponding pump pressure diagram, the pump pressures being plotted against the angular rotation of the cam shaft.

If the fuel pump cam lifting curve for an explosion chamber of this type is designed according to Fig. 2, there is obtained the pump pressure diagram shown in Fig. 3. The injection of fuel into the combustion chamber (which has already been partially or completely filled with air, as for example in the manner described in my copending application, Ser. No. 404,688) thus occurs with penetration of the fuel particles to the exhaust valve 4. The movement of the fuel is schematically illustrated in Fig. 1 at injection pressures of 40, 60, and 80 atmospheres. As soon as the highest pump pressure is reached, the ignition of the fuel and air mixture may take place. It is immaterial whether the ignition occurs by means of an igniting spark, by a glowing portion of the igniter or by the residual combustion gases. It is important only that the ignition be begun with certainty only when or after the complete charge has been introduced into the chamber. As this result is secured by the present invention, the occurrence of the above described disadvantages are avoided. There occur therefore neither pre-ignitions nor backward flow of combustion gases into the air conduit, nor knocking combustion, and the ignition, like the combustion, proceeds uniformly.

The valves 3 and 4 may be hydraulically controlled in any suitable manner (see for example my United States Patent No. 877,194), control impulses being transmitted through conduits 8 and 9 from a rotating distributor 10, such impulses acting upon pistons arranged in the valve housings 17 and 18. The valves 3 and 4 open at the exact predetermined instants under the influence of these control impulses. The distributor 10 may be operated by a driving mechanism 11 which is independent of the turbine shaft. The fuel is fed to the fuel inlet member by a fuel pump 12 of any suitable construction through conduit 15 at definite predetermined instants. The pump 12 may be driven by the mechanism 11. The fuel is conducted to the pump 12 from a fuel supply tank 14 through suction conduit 13. Any fuel sucked into the pump but not injected into the combustion chamber when the latter is operating at smaller loads is led back to the tank 14 by surplus fuel conduit 16. The cam which operates the plunger of the pump 12 has the profile 2' shown in Fig. 2, so that the pump pressure in the fuel conduit 15 has the characteristic 2' shown in Fig. 3.

The improvement described in connection with Figs. 1–3 is obtained also in a construction according to Figs. 4–6, wherein two fuel inlet members 2 and 7 are spaced along the length of the explosion chamber 1, the fuel inlets being operated in such timed relation, that the inlet member 7 arranged closer to the exhaust valve 4 begins to operate later than the more distant inlet member 2. This timing is effected by suitably displacing the operating mechanism of the fuel pumps associated with the inlet members 2 and 7. Fig. 5 shows by curve 2' in full lines the plunger movement of the pump which is connected to the inlet member 2, while the dotted line 7' shows the plunger movement of the fuel pump connected with the inlet member 7, the diagrams being plotted against angular rotation of the cam shaft as abscissa.

Fig. 6 shows the corresponding pump pressures, likewise plotted against angular rotation of the cam shaft, the pump pressure being so determined that the fuel inlet member 2 fills the space lying between members 2 and 7, while fuel inlet member 7 fills the space between such member and the exhaust valve 4. Through such phase displacement of the lifting movement of the two plungers, there is thus obtained, according to the invention, stepwise progressive charging of the chamber with fuel, from which mode of charging flow the advantages above referred to.

The two plunger movement curves according to Fig. 5 or the curve according to Fig. 2 may be so designed that a constantly progressing filling of the combustion chamber within the spatial divisions of the chamber occurs, as is schematically represented in Fig. 1. Whichever of the described processes and of the illustrated constructions for carrying out the same are selected, the result is obtained that no ignition occurs before the charging period has terminated, so that the difficulties caused by pre-ignition are avoided.

As in Fig. 1, the numerals 17 and 18 in Fig. 4 indicate the piston housings associated with the valves 3 and 4. Control impulses are directed at predetermined instants against control mechanisms arranged in these housings, such impulses being conveyer through conduits 8 and 9 from a rotating distributor 10. The mechanism 11 which is independent of the turbine shaft and drives the distributor 10, operates also the two fuel pumps 12 and 19 which conduct fuel to the fuel injector members 2 and 7 at predetermined instants through pressure pipe 15 and 20. The pumps 12 and 19 suck the fuel through conduits 13 from the supply tank 14, while the surplus fuel conduits 16 returns excess fuel sucked in by the pumps to the tank 14.

Figs. 5 and 6 show the displacement of the cam surfaces, which is apparent also from Fig. 4. Fig. 6 illustrates the characteristic of the pressure in the fuel conduits 15 and 20. In large explosion chambers the cam surfaces 2' and 7' shown in Fig. 5 may advantageously be constructed in the manner shown in Fig. 2. In such case each of the pressure characteristics 2' and 7' in Fig. 6 assumes the form of the characteristic 2' shown in Fig. 3.

It will be understood that the particular fuel pressures to be employed will depend in large part upon the pressure in the explosion chamber, the shape and size of the chamber, and the construction of the fuel inlet members. The optimum pressures for any given explosion chamber can readily be determined by simple experiment. The fuel employed may be gaseous, liquid or solid, in the embodiments of the invention illustrated it is liquid. My improved method of charging fuel may be utilized in connection with any desired or known mode of charging the combustion-supporting and/or scavenging air not inconsistent therewith. Variations from the specific embodiments of the invention disclosed may be resorted to within the scope of the appended claims without departing from the spirit of the invention.

I claim:

1. The method of charging fuel into a constant volume explosion chamber, following the scavenging of the chamber with combustion-supporting air, to distribute the fuel substantially uniformly throughout the body of air and to enable ignition to be effected as soon as the fuel reaches the place of ignition while avoiding the introduction of fuel into an already formed flame, said chamber having inlet valves at one end and an exhaust valve at the opposite end thereof, the ignition place being located in the region of such opposite end, which comprises first filling and occupying the portions of the chamber in the vicinity of the inlet valves with fuel and subsequently filling and occupying with subsequently introduced fuel the portion of the chamber in the vicinity of the ignition place.

2. The method of charging fuel into a constant volume explosion chamber of elongated form, following the scavenging of the chamber with combustion-supporting air, to distribute the fuel substantially uniformly throughout the body of air and to enable ignition to be effected as soon as the fuel reaches the place of ignition while avoiding the introduction of fuel into an already formed flame, said chamber having a fuel inlet member located at one end and an exhaust valve near the opposite end thereof, the ignition place being located in the region of such opposite end, which comprises filling and occupying first the portions of the chamber near said inlet member with fuel, and subsequently filling and occupying with subsequently introduced fuel the portion of the chamber in the vicinity of the exhaust valve.

3. The method of charging fuel into a constant volume explosion chamber, following the scavenging of the chamber with combustion-supporting air, to distribute the fuel substantially uniformly throughout the body of air and to enable ignition to be effected as soon as the fuel reaches the place of ignition while avoiding the introduction of fuel into an already formed flame, said chamber having a fuel inlet member, and an exhaust valve spaced therefrom, the ignition place being located in the region of such exhaust valve, which comprises progressively filling and occupying with fuel the portions of the chamber progressively more remote from the inlet end in the direction of said valve, so that the portion of the fuel charge introduced first remains at the inlet end of the chamber and that introduced last occupies the space in the vicinity of said valve.

4. The method of charging fuel into a constant volume explosion chamber of elongated form, following the scavenging of the chamber with combustion-supporting air, to distribute the fuel substantially uniformly throughout the body of air and to enable ignition to be effected as soon as the fuel reaches the place of ignition while avoiding the introduction of fuel into an already formed flame, said chamber having a fuel inlet member located at one end and an exhaust valve near the opposite end thereof, the ignition place being located in the region of the exhaust valve, which comprises progressively filling and occupying with fuel the portions of the chamber progressively more remote from the inlet end in the direction of said ignition place, so that the portion of the fuel charge introduced first remains at the inlet end of the chamber and that introduced last occupies the space in the vicinity of said place.

5. The method of charging fuel into a constant volume explosion chamber, following the scavenging of the chamber with combustion-supporting air, to distribute the fuel substantially uniformly throughout the body of air and to enable ignition to be effected as soon as the fuel reaches the place of ignition while avoiding the introduction of fuel into an already formed flame, said chamber having a fuel inlet member, and an exhaust valve spaced therefrom, the ignition place being located in the region of the exhaust valve, which comprises charging such fuel at progressively increasing pressures in the direction of said ignition place until substantially the end of the fuel charging period, so that the chamber is progressively filled and occupied with fuel from the inlet side thereof toward said ignition place, the portion of fuel first introduced remaining in the vicinity of the inlet member and the last portion reaching said ignition place.

6. The method of charging fuel into a constant volume explosion chamber, following the scavenging of the chamber with combustion-supporting air, to distribute the fuel substantially uniformly throughout the body of air and to enable ignition to be effected as soon as the fuel reaches the place of ignition while avoiding the introduction of fuel into an already formed flame, said chamber having an exhaust valve at one end thereof, the ignition place being located in the region of the exhaust valve, which comprises introducing fuel into such chamber at a plurality of spaced points in timed sequence such that the fuel is admitted in the vicinity of the ignition place of such chamber after the admission of fuel in the portion of the chamber more removed from such ignition place has commenced, the fuel being admitted under such pressure that the portions admitted at points removed from the ignition place remain in the region of such points and the portion introduced last remains in the vicinity of the ignition place.

7. The method of charging fuel into a constant volume explosion chamber, following the scavenging of the chamber with the combustion-supporting air, to distribute the fuel substantially uniformly throughout the body of air and to enable ignition to be effected as soon as the fuel reaches the place of ignition while avoiding the introduction of fuel into an already formed flame, which comprises charging fuel into the chamber at progressively increasing pressure at a plurality of points spaced from the ignition place thereof along the length of the chamber, the pressure increasing until substantially the end of the charging period, whereby fuel is charged in the vicinity of said ignition place after the portions of the chamber more removed from such place have been filled, the fuel being admitted under such pressure that the portions admitted at points removed from the ignition place remains in the region of such points and the portion introduced last remains in the vicinity of the ignition place.

8. The method of charging fuel into a constant volume explosion chamber, following the scavenging of the chamber with the combustion-supporting air, to distribute the fuel substantially uniformly throughout the body of air and to enable ignition to be effected as soon as the fuel reaches the place of ignition while avoiding the introduction of fuel into an already formed flame, which comprises charging fuel into the chamber at progressively increasing pressure at a plurality of points spaced from the ignition place thereof along the length of the chamber, the pressure increasing until substantially the end of the charging period, and initiating the charging at the point in the vicinity of the ignition place after the charging at the point or points more removed from said place has commenced, whereby fuel is charged in the vicinity of said ignition place after the portions of the chamber more removed from said place have been filled, the fuel being admitted under such pressure that the portions admitted at points removed from the ignition place remain in the region of such points and the portion introduced last remains in the vicinity of the ignition place.

9. In combination, a constant volume explosion chamber including fuel inlet means and an exhaust valve spaced therefrom, fuel pump mechanism cooperating with said inlet means to introduce fuel through said means first into the portion of the chamber farther removed from said valve in such manner that such first portion of fuel remains in said portion of the chamber, and finally into the portion of the chamber in the vicinity of such valve, whereby the chamber is substantially uniformly filled with fuel by the time sufficient fuel reaches the region of the outlet valve to form a combustible mixture with air therein, and means located in the vicinity of said outlet valve for effecting ignition of the combustible mixture.

10. In combination, a constant volume explosion chamber including an exhaust valve at the outlet end thereof and a plurality of fuel inlet members distributed along the length of the chamber, fuel pump mechanism cooperating with said inlet members to feed fuel first to the inlet members farther removed from the exhaust valve, so that fuel is caused to fill and remain in the chamber space removed from the valve, and finally to the inlet member located in the vicinity of said valve, so that fuel reaches the vicinity of said valve only after the rest of the chamber has received its quota of fuel, whereby the chamber is substantially uniformly filled with fuel by the time sufficient fuel reaches the region of the outlet valve to form a combustible mixture with air therein, and means located in the vicinity of said outlet valve for effecting ignition of the combustible mixture.

11. The combination as set forth in claim 10, wherein said fuel feed mechanism comprises cam-controlled pumps whose cams are angularly displaced in correspondence with the sequence of operation of said fuel inlet members.

12. In combination, a constant volume explosion chamber including fuel inlet means and an exhaust valve spaced therefrom, fuel pump mechanism cooperating with said inlet means and constructed to deliver fuel at a pressure increasing to substantially the end of the fuel charging interval so as to introduce fuel through said means at increasing pressures of such magnitudes during the interval allotted to fuel admission, that the portion of the chamber farther removed from the exhaust valve is filled first with a substantially quiescent body of fuel which remains therein until ignition, and finally the portion of the chamber in the vicinity of such valve, whereby the chamber is substantially uniformly filled with fuel by the time sufficient fuel reaches the region of the outlet valve to form a combustible mixture with air therein, and means located in the vicinity of said outlet valve for effecting ignition of the combustible mixture.

13. The combination as set forth in claim 9, wherein said pump mechanism includes a plunger and a cam for controlling the same, the cam being of such shape that the rate of lift of the plunger, and hence the pressure of the delivered fuel, increases substantially to the end of the fuel-admitting interval.

14. The combination as set forth in claim 10, wherein said fuel feeding mechanism comprises pump mechanism constructed to feed said fuel at progressively increasing pressures during the interval allotted to fuel admission for each inlet member.

15. The combination as set forth in claim 10, wherein said fuel pump mechanism includes cam-operated plungers, the cams being of such shape that the rate of lift of the plungers, and hence the pressure of the delivered fuel increases substantially to the end of the fuel-admitting interval.

HANS HOLZWARTH.